(12) United States Patent
Namai et al.

(10) Patent No.: US 8,458,594 B2
(45) Date of Patent: Jun. 4, 2013

(54) CONTROL DEVICE, CONTROL METHOD, AND CONTROL SYSTEM

(75) Inventors: Mie Namai, Tokyo (JP); Shuichi Otsu, Kanagawa (JP)

(73) Assignee: Sony Corporation (JP)

(*) Notice: Subject to any disclaimer, the term of this patent is extended or adjusted under 35 U.S.C. 154(b) by 247 days.

(21) Appl. No.: 12/456,659

(22) Filed: Jun. 19, 2009

(65) Prior Publication Data
US 2009/0319900 A1 Dec. 24, 2009

(30) Foreign Application Priority Data
Jun. 20, 2008 (JP) .............................. P2008-161991

(51) Int. Cl.
*G06F 3/00* (2006.01)
(52) U.S. Cl.
USPC ............ 715/717; 715/716; 715/734; 715/736
(58) Field of Classification Search
USPC ......................... 715/717, 718, 734, 736–739
See application file for complete search history.

(56) References Cited

U.S. PATENT DOCUMENTS

| | | | |
|---|---|---|---|
| 6,182,094 B1* | 1/2001 | Humpleman et al. ......... | 715/234 |
| 7,111,788 B2* | 9/2006 | Reponen .................. | 235/472.01 |
| 7,200,683 B1* | 4/2007 | Wang et al. ................. | 709/250 |
| 7,571,014 B1* | 8/2009 | Lambourne et al. ............ | 700/94 |
| 7,631,062 B2* | 12/2009 | Motoyama .................... | 709/223 |
| 7,689,305 B2* | 3/2010 | Kreifeldt et al. ................ | 700/94 |
| 7,788,587 B2* | 8/2010 | Michelman ................... | 715/734 |
| 7,992,099 B2* | 8/2011 | Jin et al. ......................... | 715/810 |
| 8,122,357 B2* | 2/2012 | Han et al. ...................... | 715/717 |
| 2002/0151327 A1* | 10/2002 | Levitt ............................. | 455/556 |
| 2002/0174270 A1* | 11/2002 | Stecyk et al. ..................... | 710/1 |
| 2003/0171113 A1* | 9/2003 | Choi ............................. | 455/420 |
| 2005/0057538 A1* | 3/2005 | Morse et al. .................. | 345/204 |

(Continued)

FOREIGN PATENT DOCUMENTS

| | | |
|---|---|---|
| JP | 2001045575 A | 2/2001 |
| JP | 2006222693 A | 8/2006 |

(Continued)

OTHER PUBLICATIONS

Office Action from Japanese Application No. 2008-161991, dated Apr. 20, 2010.

(Continued)

*Primary Examiner* — Weilun Lo
*Assistant Examiner* — Enrique Iturralde
(74) *Attorney, Agent, or Firm* — Lerner, David, Littenberg, Krumholz & Mentlik, LLP

(57) ABSTRACT

A control device includes a communication unit communicating via a network with a content supply device and reproduction devices, an operation unit, a display unit, and a control unit receiving a signal from the operation unit and controlling the communication unit and the display unit. The control unit has a content list display state displaying on a screen of the display unit a content list received from the content supply device, a device list display state displaying on the screen thumbnail images of the reproduction devices in accordance with device information received from the reproduction devices, and an operation panel display state displaying an operation panel for having a content item of the content list reproduced by one of the reproduction devices set in the device list display state. The thumbnail image of the reproduction device is displayed in the content list display state and the operation panel display state.

6 Claims, 8 Drawing Sheets

U.S. PATENT DOCUMENTS

| | | | |
|---|---|---|---|
| 2005/0144644 A1* | 6/2005 | Hirota | 725/90 |
| 2006/0045462 A1* | 3/2006 | Poslinski | 386/46 |
| 2006/0053375 A1* | 3/2006 | Humpleman et al. | 715/736 |
| 2006/0150115 A1* | 7/2006 | Jin et al. | 715/764 |
| 2006/0212827 A1* | 9/2006 | Lee | 715/810 |
| 2006/0236349 A1* | 10/2006 | Lee | 725/80 |
| 2007/0100839 A1* | 5/2007 | Kim et al. | 707/10 |
| 2007/0162667 A1* | 7/2007 | Kim et al. | 710/62 |
| 2008/0046539 A1* | 2/2008 | Lee et al. | 709/217 |

FOREIGN PATENT DOCUMENTS

| | | |
|---|---|---|
| JP | 2006-332772 A | 12/2006 |
| JP | 2007235571 A | 9/2007 |
| JP | 2007306088 A | 11/2007 |

OTHER PUBLICATIONS

Office Action from Japanese Application No. 2008-161991, dated Jun. 29, 2010.

* cited by examiner

CONTROL DEVICE, CONTROL METHOD, AND CONTROL SYSTEM

The present application claims priority from Japanese Patent Application No. JP 2008-161991 filed in the Japanese Patent Office on Jun. 20, 2008, the entire content of which is incorporated herein by reference.

BACKGROUND OF THE INVENTION

1. Field of the Invention

The present invention relates to a control device, a control method, and a control system applied to remote control of a plurality of devices connected in a network.

2. Description of the Related Art

A home network connecting a plurality of electronic devices present thereon has been developed for practical use. For example, the DLNA (Digital Living Network Alliance) has formulated specifications (guidelines) for mutual use of content such as moving image, music, and still image between digital AV (Audio Visual) devices and personal computers mutually connected by the home network. The content refers to a set of information in general which a person can view on a website or through a medium. Specifically, the content includes music, movies, text, comics, games, web pages, and so forth. According to the DLNA specifications, the following are specified as devices.

A DMS (Digital Media Server) is a content supply unit providing content. In the following description, the DMS will be referred to as the server. Specifically, the DMS includes a hard disk, a video recorder, a personal computer, a video camera with an integrated recorder (so-called camcorder), a digital camera, and so forth.

A DMP (Digital Media Player) is a control reproduction unit having an interface function and a content reproduction function. In the following description, the DMP will be referred to as the player. Specifically, the DMP includes a television receiver, an audio system, a computer game machine, and so forth.

A DMR (Digital Media Renderer) is a reproduction unit having a function of reproducing digital content stored in the DMS. In the following description, the DMR will be referred to as the renderer. Specifically, the DMR includes a video monitor, a speaker, and so forth.

A DMC (Digital Media Controller) is a control unit having an interface function operated by a user. In the following description, the DMC will be simply referred to as the controller. Specifically, the DMC includes a remote controller, a mobile phone, a pocket personal computer, and so forth. The controller may be provided with not only the interface function but also a function of reproducing content.

In the home network constructed in accordance with the DLNA specifications, AV content stored in the server can be selected and reproduced by the player via the network, and AV content selected by the controller can be reproduced by the renderer. If the network is connected to a plurality of devices, a user selects one of the plurality of devices to be controlled by the controller. However, it is not easy to identify which device is the currently controlled target device (current target device). Therefore, there is a possibility of causing an operational error.

To address the above-described issue, Japanese Unexamined Patent Application Publication No. 2006-332772 proposed in the past proposes to display, on an operation panel of the controller, a thumbnail image showing the current target device.

SUMMARY OF THE INVENTION

In the invention described in the above patent application publication, the screen displaying the thumbnail image is limited to the operation panel. However, it is desirable that the current target device can be easily identified also on a screen other than the operation panel. Further, in the invention described in the patent application publication, the thumbnail image of the device is stored by the controller. If the number of thumbnail images is increased, therefore, the resource of the controller is reduced. As a result, the operation of the controller may be interfered with.

In view of the above, it is desirable in the present invention to provide a control device, a control method, and a control system enabling easier identification of the current target device.

To address the above-described issues, a control device according to an embodiment of the present invention includes a communication unit, an operation unit, a display unit, and a control unit. The communication unit is configured to communicate, via a network, with a content supply device supplying content and a plurality of reproduction devices reproducing the content transmitted from the content supply device. The control unit is configured to be supplied with a signal from the operation unit and control the communication unit and the display unit. The control unit has a content list display state in which a content list received from the content supply device is displayed on a screen of the display unit, a device list display state in which respective thumbnail images of the plurality of reproduction devices are displayed on the screen in accordance with device information received from the plurality of reproduction devices, and an operation panel display state in which an operation panel is displayed to have a content item of the content list reproduced by one of the plurality of reproduction devices set as a control target in the device list display state. The thumbnail image of the set reproduction device is displayed in the content list display state and the operation panel display state.

Preferably, each of the reproduction devices may store the thumbnail image thereof, and the device information may include the thumbnail image.

Preferably, the control device may have a function of reproducing the content, and the control device may be capable of displaying the thumbnail image thereof in the content list display state, the device list display state, and the operation panel display state.

Preferably, the control unit may shift to the content list display state upon receipt of the content list from the content supply device, and the control unit may shift to the device list display state upon receipt of the device information. Further, preferably, the control unit may shift to the operation panel display state when a content item selected in the content list display state is reproduced, and the control unit may shift to the content list display state upon receipt of an instruction not to display the operation panel in the operation panel display state.

A control method according to an embodiment of the present invention performs communication, via a communication unit and a network, with a content supply device supplying content and a plurality of reproduction devices reproducing the content transmitted from the content supply device. The control method includes the steps of: displaying, upon receipt of a content list from the content supply device, the content list on a screen of a display unit; displaying a device list displaying respective thumbnail images of the plurality of reproduction devices on the screen in accordance with device information received from the plurality of reproduction devices; and displaying an operation panel for having a content item of the content list reproduced by one of the plurality of reproduction devices set as a control target in the step of displaying the device list. The thumbnail image of the set reproduction device is displayed in the step of displaying the content list and the step of displaying the operation panel.

A control system according to an embodiment of the present invention connects, via a network, a content supply device supplying content, a plurality of reproduction devices reproducing the content transmitted from the content supply device, and a control device operating a selected one of the plurality of reproduction devices. The control device includes a communication unit connected to the network and configured to communicate with the content supply device and the plurality of reproduction devices, an operation unit, a display unit, and a control unit configured to be supplied with a signal from the operation unit and control the communication unit and the display unit. The control unit has a content list display state in which a content list received from the content supply device is displayed on a screen of the display unit, a device list display state in which respective thumbnail images of the plurality of reproduction devices are displayed on the screen in accordance with device information received from the plurality of reproduction devices, and an operation panel display state in which an operation panel is displayed on the screen to have a content item of the content list reproduced by one of the plurality of reproduction devices set as a control target. The thumbnail image of the set reproduction device is displayed in the content list display state and the operation panel display state.

According to the embodiments of the present invention, the thumbnail image of the reproduction device set as the control target is displayed on the screen of the display unit not only in the operation panel display state but also in the content list display state. Therefore, a user can easily identify the reproduction device set as the current control target. Further, the thumbnail images stored in the reproduction devices are used. Therefore, the memory capacity of the controller can be prevented from being consumed by the thumbnail images.

DESCRIPTION OF THE PREFERRED EMBODIMENTS

Embodiments of the present invention will be described below with reference to the drawings. The embodiments described below are preferred specific examples of the present invention, and a variety of technically preferred limitations are given to the embodiments. In the following description, however, the scope of the present invention is not limited to the embodiments unless a description particularly limiting the present invention is given.

In an embodiment of the present invention, a server, a renderer, and a controller (player) are connected via a home network. The server supplies content. The renderer reproduces the content in accordance with an operation by another device. The controller has a function of reproducing the content supplied by the server and a function of performing an operation for having the content reproduced by the renderer. The network is constructed in accordance with the DLNA specifications, for example. In this system, the thumbnail image of the current target device is constantly displayed on a GUI (Graphical User Interface) screen of the controller.

Figure 1:
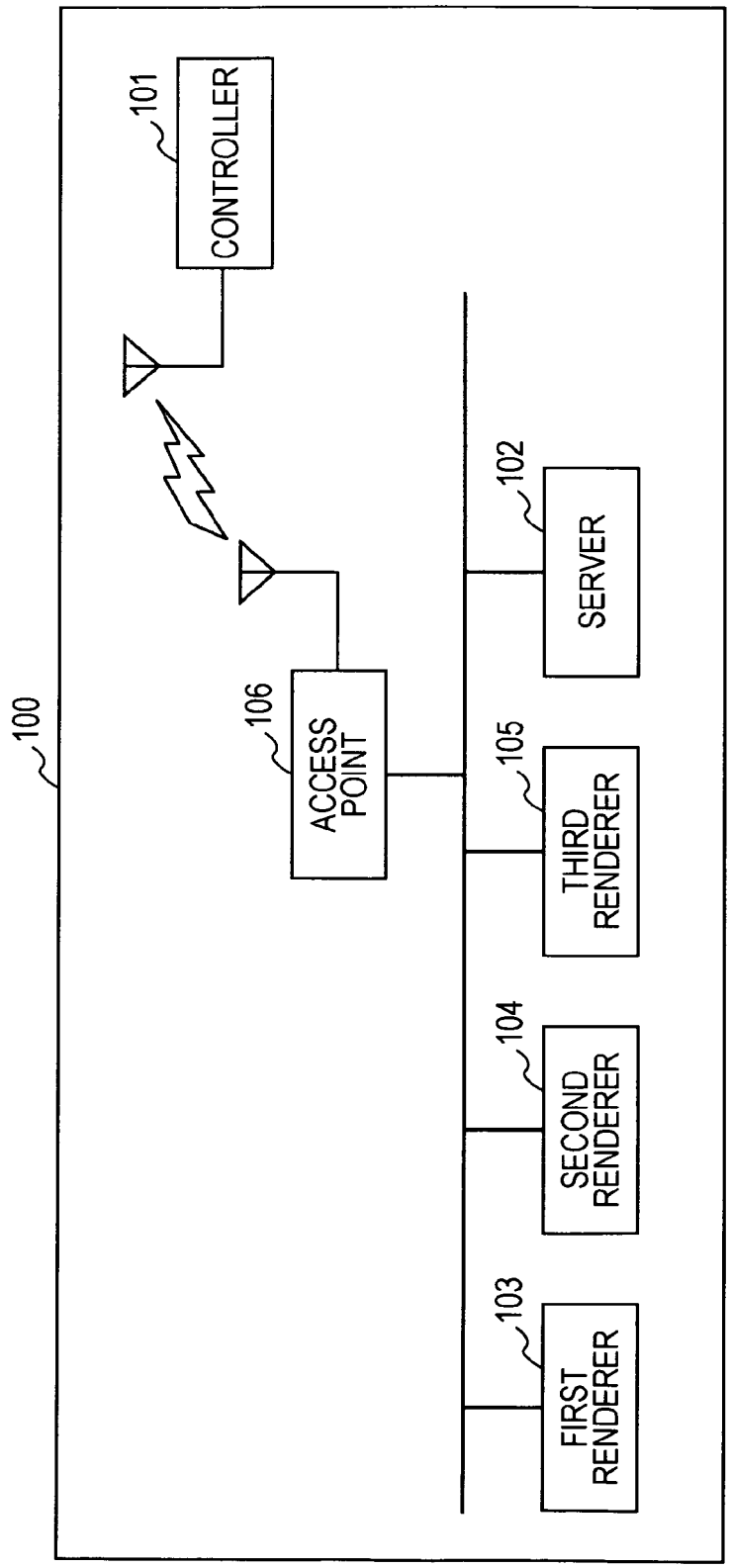
FIG. 1 is a block diagram illustrating a configuration example of a network and a system in an embodiment of the present invention.

FIG. 1 illustrates a configuration example of the network and the system. A controller 101 bidirectionally communicates with a server 102, a first renderer 103, a second renderer 104, and a third renderer 105, and has a function of controlling the server 102 and the renderers 103, 104, and 105. Further, in consideration of convenience for users, the controller 101 performs wireless communication to enable the use thereof without having the installation location thereof fixed to a particular position. As illustrated in FIG. 1, an in-home LAN (Local Area Network) 100 having a wireless LAN access point 106 is constructed for wireless communication between the controller 101 and the server 102 and the renderers 103, 104, and 105.

In this embodiment of the present invention, it is assumed that the server 102 only has a wired LAN function, and that the controller 101 only has a wireless LAN function. Further, a wireless LAN network called infrastructure mode is constructed. If the server 102 has a wireless LAN function, however, the server 102 and the controller 101 can perform ad-hoc mode communication and construct a wireless LAN network not using an access point.

Figure 2:
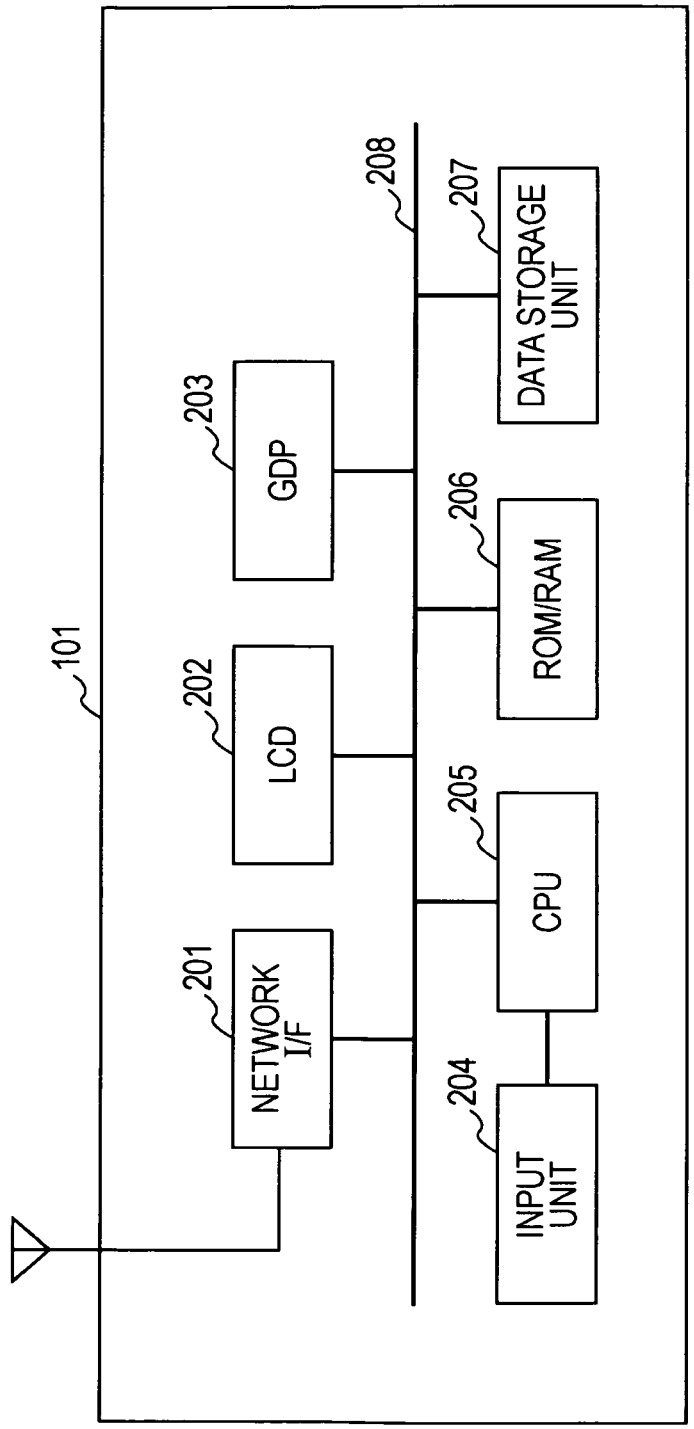
FIG. 2 is a block diagram illustrating a configuration example of a controller in an embodiment of the present invention.

FIG. 2 illustrates a configuration of the controller 101. A PDA (Personal Digital Assistant) is one example of the controller 101. The controller 101 includes a wireless LAN network I/F (Interface) 201. The network I/F 201 performs communication via a wireless LAN conforming to the IEEE (Institute of Electrical and Electronics Engineers) 802 standard, for example.

An LCD (Liquid Crystal Display) 202 for displaying the content and the GUI and a GDP (Graphical Data Processor) 203 for processing data displayed on the LCD 202 are connected by a bus 208. Further, a CPU (Central Processing Unit) 205, a ROM (Read Only Memory) and RAM (Random Access Memory) 206, and a data storage unit 207 are connected by the bus 208. The CPU 205 performs a variety of processes of the controller 101. In the ROM and RAM 206, the ROM stores programs for the variety of processes, and the RAM loads and executes the programs. The data storage unit 207 stores a variety of information such as command sets for remote-controlling the respective renderers 103, 104, and 105. The data storage unit 207 is formed by a non-volatile memory.

Further, an input unit 204 is provided to allow a user to operate the GUI. The input unit 204 includes a plurality of physical input keys, and serves as an interface for allowing the user to input a command to the controller 101. The input unit 204 is configured to include a key operation section including such keys as a direction key and a confirmation key, for example, and supplies the CPU 205 with a predetermined operation signal according to the operation by the user. The input unit 204 may be configured as a touch panel.

When the controller 101 performs remote control of the first renderer 103, for example, the CPU 205 reads the command set for the renderer 103 stored in the data storage unit 207, and the LCD 202 displays a command corresponding to the command set.

With reference to the display on the operation panel, the user operates the input unit 204 to select the command for controlling the renderer 103 by using the direction key and the confirmation key. Then, the command is supplied from the input unit 204 to the network I/F 201, and is wirelessly transmitted to the access point 106. The command is then supplied to the renderer 103 via the access point 106 and the wired LAN. Thereby, the renderer 103 performs an operation instructed by the command.

Figure 3:
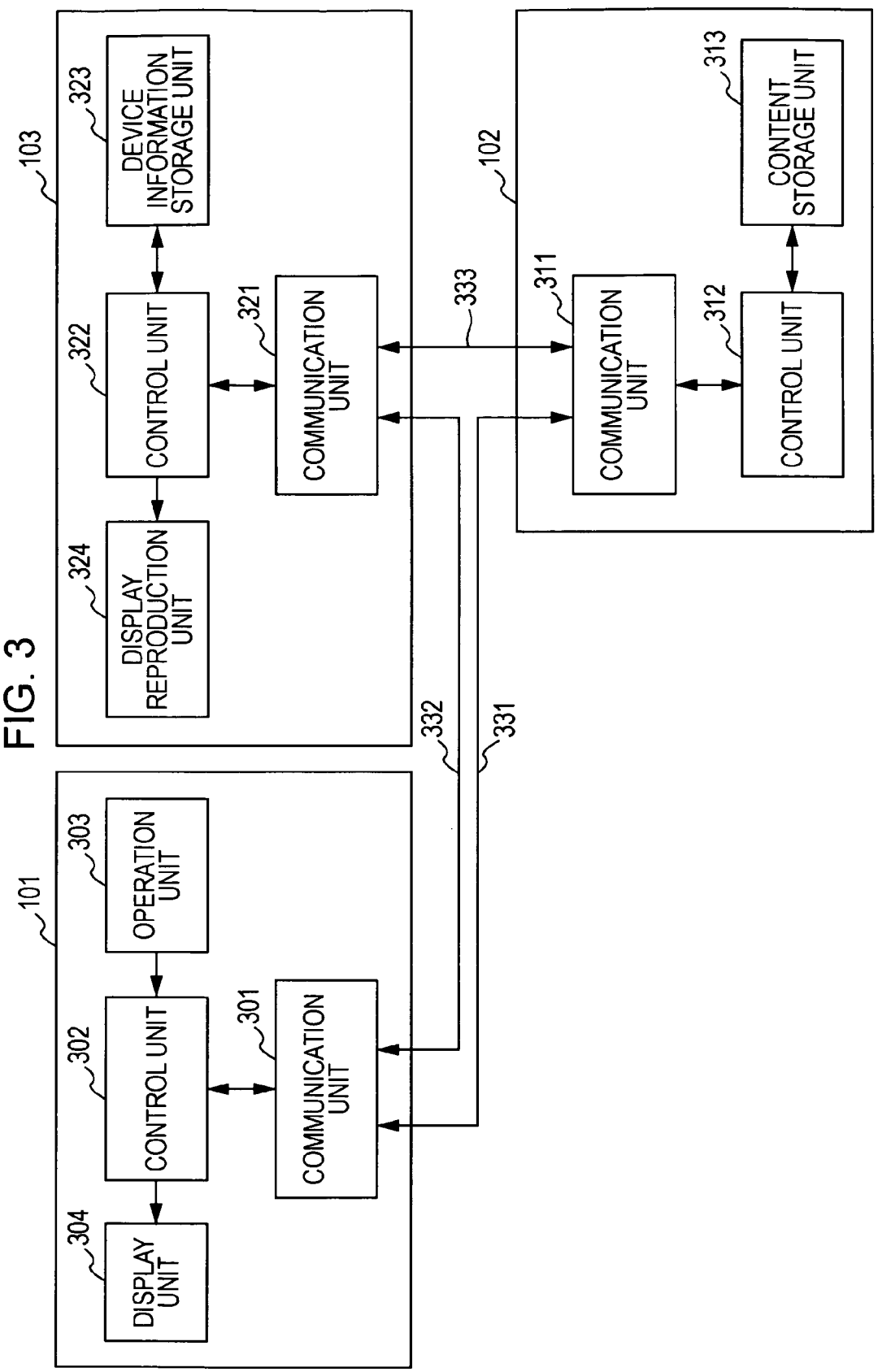
FIG. 3 is a block diagram illustrating a functional block in an embodiment of the present invention.

With reference to FIG. 3, a functional block including the controller 101, the server 102, and the renderer 103 will be described. Although the renderer 103 will be described as a representative example of the renderer, the other renderers 104 and 105 have the same function as the function of the renderer 103. The controller 101 and the server 102 are bidirectionally communicably connected by a communication path 331 formed by the wireless LAN, the access point 106, and the wired LAN. The controller 101 and the renderer 103 are bidirectionally communicably connected by a communication path 332 formed by the wireless LAN, the access point 106, and the wired LAN. The server 102 and the renderer 103 are bidirectionally communicably connected by a communication path 333 formed by the wired LAN.

The controller 101 is configured to include a communication unit 301, a control unit 302, an operation unit 303, and a display unit 304. The operation unit 303 is realized by the input unit 204 illustrated in FIG. 2. When the operation unit 303 is operated, a signal corresponding to the operated button or the like of the operation unit 303 is supplied to the control unit 302.

The control unit 302 is realized mainly by the CPU 205 of FIG. 2. Upon receipt of the signal supplied by the operation unit 303, the control unit 302 performs a process in accordance with the signal.

The display unit 304 is realized by the LCD 202. The display unit 304 displays a screen displaying operation items (operation panel) for operating the renderer 103, for example.

The communication unit 301 is realized by the network I/F 201. A command corresponding to the operation of the operation unit 303 is supplied to the communication unit 301, and is transmitted via the wireless LAN to the device set as the control target (current target device), such as the renderer 103, for example. Further, the communication unit 301 transmits to the control unit 302 device information such as a content list received from the server 102 and a thumbnail image received from the renderer 103 (hereinafter referred to as the renderer information).

The server 102 is configured to include a communication unit 311, a control unit 312, and a content storage unit 313. The content storage unit 313 has a function of storing the content of the server 102. The control unit 312 accesses the content storage unit 313 to acquire the content list and the content.

In accordance with the operation of the operation unit 303 by the user, the control unit 302 controls the GUI displayed on the display unit 304. The controller 101 transmits, via the communication unit 301, a content list provision request to the server 102 and a renderer information provision request and a content reproduction request to the renderer 103. The controller 101 receives, via the communication unit 301, the content list from the server 102 and the renderer information and a reproduction notification from the renderer 103. The content list, the renderer information, and the reproduction notification are supplied to the control unit 302.

The display unit 304 receives the content list, the renderer information, and the reproduction notification transmitted from the controller 302, and displays the content list, the renderer information, and the reproduction notification as the GUI. The displayed GUI is operated through the operation unit 303 via the control unit 302.

In the server 102, the communication unit 311 transmits to the control unit 312 the requests received from the controller 101 and the renderer 103. The communication unit 311 further transmits to the controller 101 the content list received from the content storage unit 313 via the control unit 312, and transmits the content to the renderer 103.

That is, the control unit 312 of the server 102 receives via the communication unit 311 the content list provision request transmitted from the controller 101, and accesses the content storage unit 313 to acquire the content list. The acquired content list is transmitted to the controller 101 via the communication unit 311. The content provision request transmitted from the renderer 103 is received via the communication unit 311, and is supplied to the control unit 312. The control unit 312 accesses the content storage unit 313 to acquire the content. The acquired content is transmitted to the renderer 103 via the communication unit 311.

The renderer 103 is configured to include a communication unit 321, a control unit 322, a device information storage unit 323, and a display reproduction unit 324. The device information storage unit 323 has a function of storing the renderer information of the renderer 103. The renderer information refers to the information necessary for the controller 101 to control a device such as a renderer, for example, and includes the name and the IP (Internet Protocol) address of the renderer. The renderer information is previously stored in the device information storage unit 323, and includes the thumbnail image used to identify the renderer, such as the image of the shape of the renderer.

In the renderer 103, the communication unit 321 transmits the request received from the control unit 322 to the controller 101 or the server 102. The communication unit 321 further supplies the control unit 322 with the renderer information provision request and the content reproduction request received from the controller 101, and supplies the control unit 322 with the content received from the server 102.

The control unit 322 receives the renderer information provision request from the controller 101 via the communication unit 321, and accesses the device information storage unit 323 to acquire the renderer information. The acquired renderer information is transmitted to the controller 101 via the communication unit 321. The control unit 322 receives, via the communication unit 321, the content reproduction request transmitted from the controller 101 and the content transmitted from the server 102. The control unit 322 then supplies the display reproduction unit 324 with the content reproduction request and the content.

The display reproduction unit 324 receives, via the control unit 322, the content reproduction request transmitted from the controller 101 and the content transmitted from the server 102, and reproduces the content.

Figure 4:
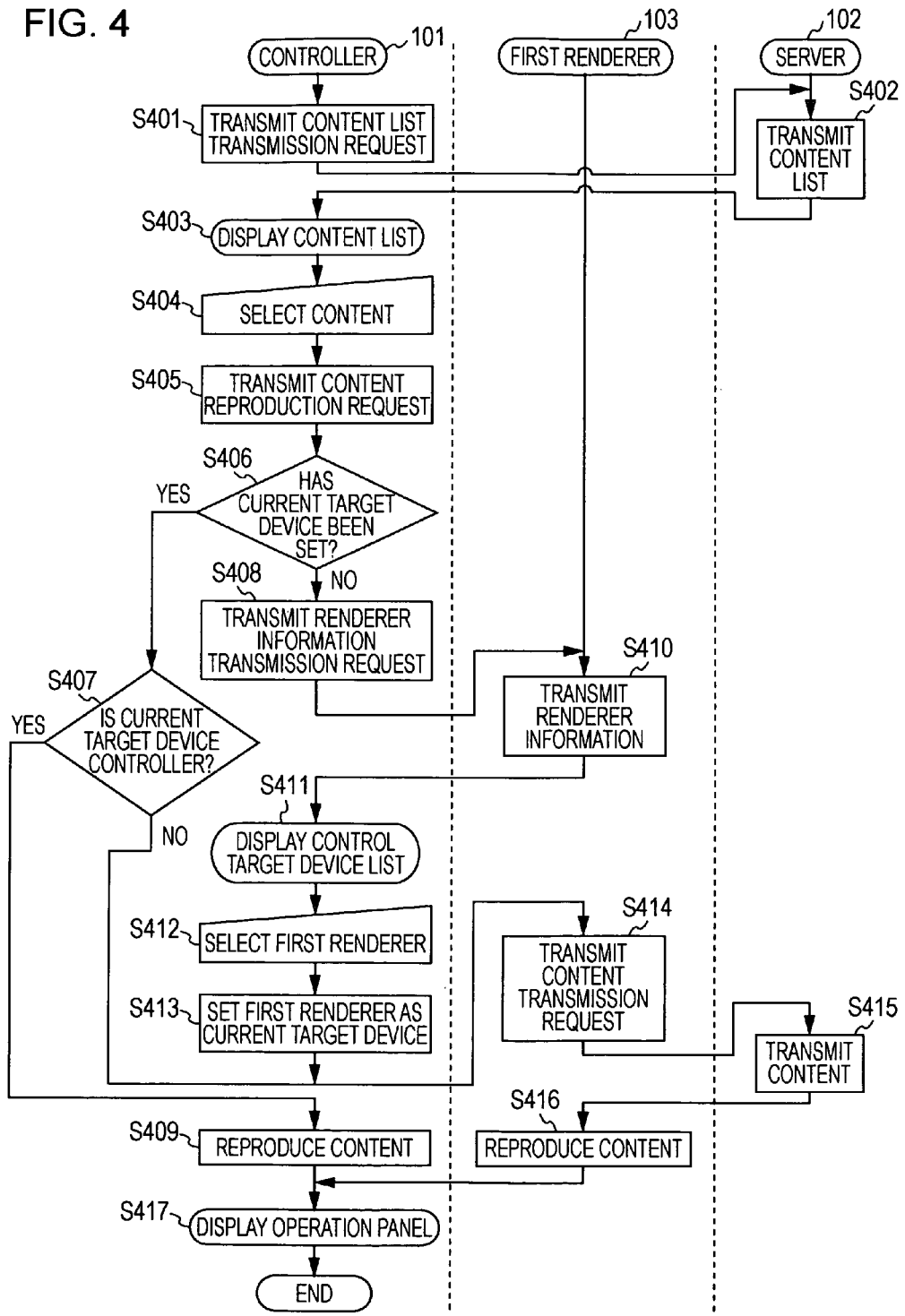
FIG. 4 is a flowchart illustrating a processing flow in an embodiment of the present invention.

Subsequently, operations of the controller 101, the server 102, and the renderer 103 will be described with reference to the flowchart of FIG. 4. The flowchart of FIG. 4 is for describing an operation of having the controller 101 select a content item of the server 102 and instructing the controller 101 or the renderer 103 to reproduce the content item. This operation is one example, and thus the present invention is also applicable to other operations, such as an operation in which a controller acquires the right to control a renderer already reproducing a content item and operates the renderer, for example. Further, although FIG. 4 only illustrates the operation of the renderer 103 as an example, the other renderers 104 and 105 present in the network also operate similarly to the renderer 103.

At Step S401, the controller 101 requests the server 102 to transmit the content list. At Step S402, the server 102 transmits the content list to the controller 101. At Step S403, the controller 101 displays the content list of the server 102 on the display unit 304 on the basis of the received content list.

At Step S404, a content item is selected from the content list in accordance with the operation by a user. At Step S405, the content reproduction request requesting the reproduction of the selected content item is transmitted. Then, at Step S406, whether or not the current target device has been set is determined. The current target device refers to a device intended to be currently operated.

If it is determined at Step S406 that the current target device of the controller 101 has been set, the processing proceeds to Step S407. If it is determined that the current target device has not been set, the processing proceeds to Step S408.

At Step S407, whether or not the already set current target device is the controller 101 is determined. In this embodiment of the present invention, the controller 101 has the content reproduction function. Thus, the content item may be reproduced by the controller 101 as well as by the renderers. If it is determined at Step S407 that the already set current target device is the controller 101, the processing proceeds to Step S409. At Step S409, the controller 101 starts reproducing the content item. Then, at Step S417, the operation panel is displayed. If the already set current target device is not the controller 101, the processing proceeds to Step S414.

If it is determined at Step S406 that the current target device has not been set, the controller 101 at Step S408 requests the renderers in the network to transmit the renderer information.

Upon receipt of the renderer information transmission request, the renderers in the network such as the renderer 103, for example, transmit the renderer information to the controller 101 at Step S410. Upon receipt of the renderer information, the controller 101 at Step S411 displays on the screen a control target device list as a device list.

The control target device list displays the thumbnail images of the renderers in the network and also the thumbnail image of the controller 101. That is, the thumbnail images of all devices controllable by the controller 101 are displayed in the list. In this case, the thumbnail images of the devices are displayed. Thus, visibility is improved, and the devices are easily identified. Therefore, a GUI easy to operate for users can be realized.

At Step S412, a device is selected in accordance with the operation by the user. In the example of FIG. 4, the renderer 103 is selected. At Step S413, the selected device (renderer 103) is set as the current target device.

After the current target device has been set, the renderer 103 at Step S414 requests the server 102 to transmit the content item. The content item has been selected at Step S404, and the reproduction request requesting the reproduction of the content item has been made at Step S405. At Step S415, the server 102 transmits the content item to the renderer 103. Upon receipt of the content item, the renderer 103 at Step S416 starts reproducing the content item, and the processing proceeds to Step S417. With the operation panel displayed at Step S417, remote control of the reproduction operation by the renderer 103 can be performed by the operation of the operation panel or the keys.

At Step S417, the operation panel for controlling the controller 101 or the renderer 103 reproducing the content item is displayed, and the flow is completed. The operation panel displays the thumbnail image of the current target device currently controlled by the user. That is, if the controller 101 is the current target device, the thumbnail image of the controller 101 is displayed on the operation panel. If the renderer 103 is the current target device, the thumbnail image of the renderer 103 acquired at Step S410 is displayed on the operation panel. Therefore, the current target device currently controlled by the user can be immediately identified, and improvement in usability can be expected.

The thumbnail image of the current target device is displayed at Step S417 (display of the operation panel) and also at Step S403 (display of the content list).

The thumbnail image is not displayed when the current target device has not been set, as in the initial activation of the controller 101. Once the current target device is set a Step S413, however, the same thumbnail image is displayed when the display screen is switched from the operation panel to the content list. The thumbnail image is constantly displayed irrespective of the switching of the screen between the content list, the operation panel, and the control target device list, unless the right to control the current target device is abandoned.

Figure 5:
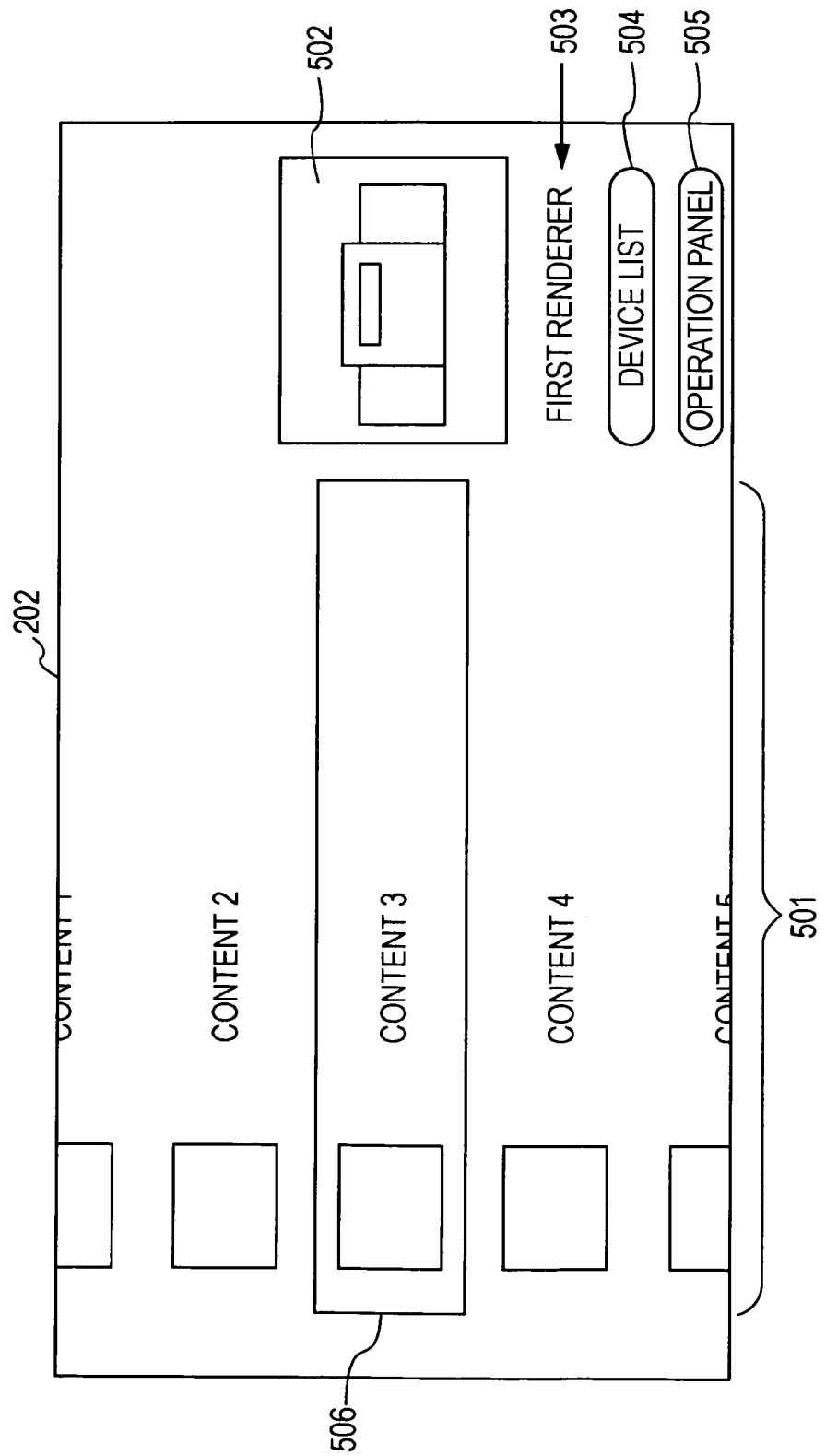
FIG. 5 is a schematic diagram illustrating a content list display screen in an embodiment of the present invention.

Subsequently, examples of the screen displayed on the LCD 202 (see FIG. 2) of the controller 101 will be described with reference to FIGS. 5 to 7. FIG. 5 illustrates an example of a content list display screen displaying on the LCD 202 the content list acquired from the server 102 (Step S403 in the flowchart of FIG. 4). Although not illustrated, keys such as the direction key, the confirmation key, a control key, and numeric keys are provided on the opposite sides of the LCD 202 of the controller 101.

The content list display screen displays a content list 501, a thumbnail image 502 showing the shape of the current target device, a device name 503, a control target device list call button 504, and an operation panel call button 505. The content list refers to a list displaying the titles of content items and the images of the content items, such as jacket photographs of the content items, for example. FIG. 5 illustrates an example in which the renderer 103 has been set as the current target device.

A focus 506 is positioned on the currently selected content item. The user operates the input unit 204 (see FIG. 2) to move the focus 506 and select the content item desired to be reproduced (Step S404 in the flowchart of FIG. 4). In the example of FIG. 5, five content items of the content list are displayed. If the scrolling operation is performed in the vertical direction by the operation of the direction key, the other content items can be displayed and selected. If a content item is selected when the current target device has been set, i.e., when the thumbnail image 502 and the device name 503 are displayed, the reproduction of the selected content item is immediately started by the current target device (Step S409 or S416 in the flowchart of FIG. 4).

In the example of FIG. 5, if "CONTENT 3" is selected and a reproduction instruction is issued, the renderer 103 starts reproducing the content item. When the content reproduction operation starts, the screen of the LCD 202 switches to the operation panel (see FIG. 7) for controlling the renderer 103. If the current target device has not been set, however, the thumbnail image 502 and the device name 503 are not displayed. If a content item is selected in this case, the display switches to the control target device list (see FIG. 6) for selecting the device used to reproduce the content item.

In FIG. 5, the content item can be reproduced by another control target device different from the current target device (another device other than the renderer 103). To select the another control target device, it is necessary to press the control target device list call button 504 to switch the display to a control target device list display state. Further, the operation panel call button 505 is provided. If the operation panel call button 505 is pressed, the display switches to the operation panel (see FIG. 7) described later. Each of the above-described buttons 504 and 505 is operated when a cursor is positioned over the button and the confirmation key is pressed. Alternatively, the function of each of the buttons 504 and 505 may be allocated not to the GUI button but to a hardware key of the controller 101.

Figure 6:
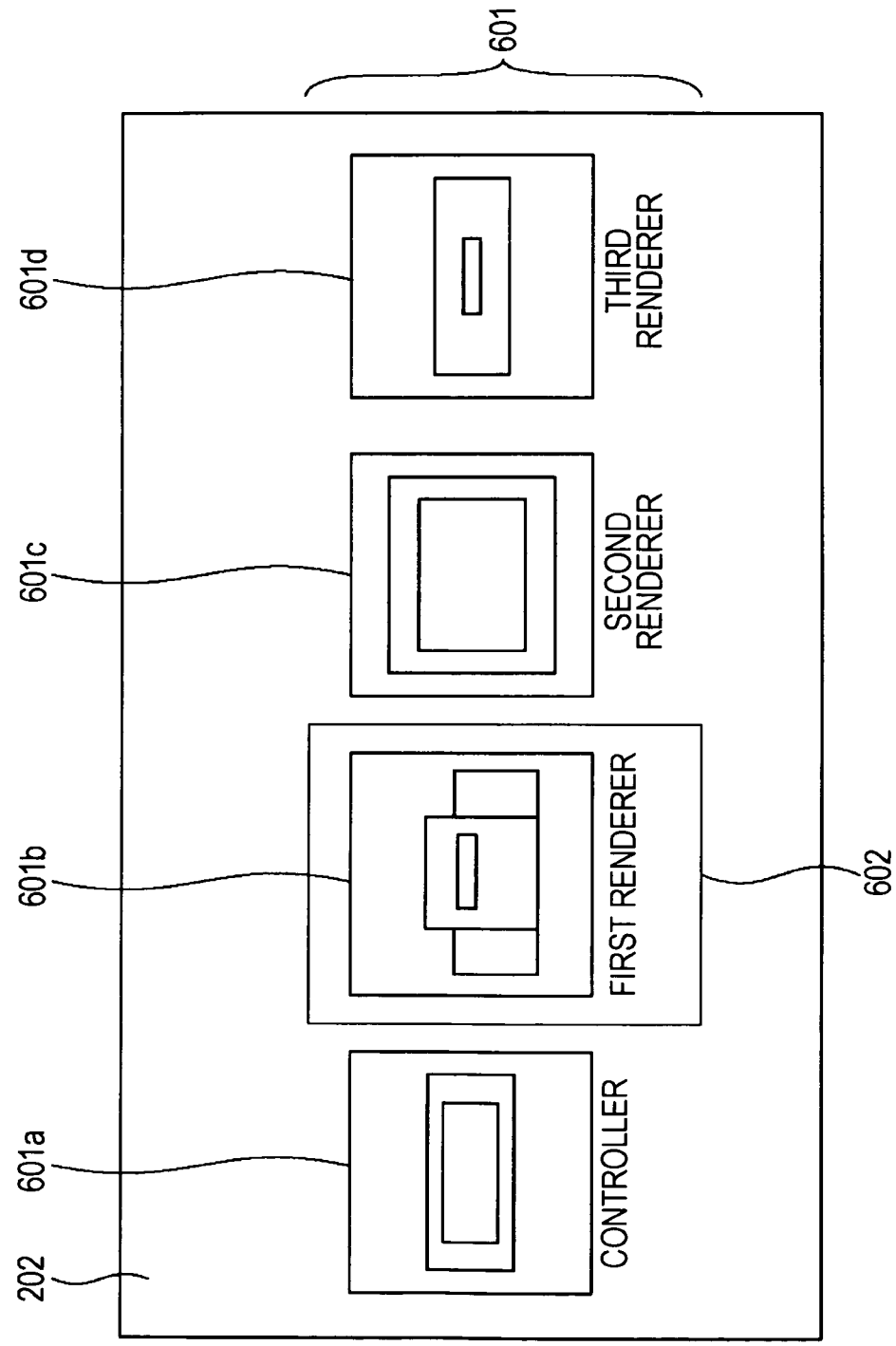
FIG. 6 is a schematic diagram illustrating a control target device list display screen in an embodiment of the present invention.

FIG. 6 illustrates an example in which the control target device list is displayed on the screen of the LCD 202 (Step S411 in the flowchart of FIG. 4). The display area of the LCD 202 displays a control target device list 601. In FIG. 6, the list is formed by a thumbnail image 601a of the controller 101, a thumbnail image 601b of the renderer 103, a thumbnail image 601c of the renderer 104, and a thumbnail image 601d of the renderer 105. The list includes the thumbnail image of the current target device (renderer 103) displayed in FIG. 5. Further, the control target device list 601 (including the renderers 103, 104, and 105) displays, as well as the thumbnail images, device names (e.g., recorder, AV amplifier, home theater, and television).

As illustrated in FIG. 6, a focus 602 is positioned on the thumbnail image and the device name of the renderer 103, which is the current target device. The user operates the input unit 204 of the controller 101 to move the focus 602 and select the device desired to be controlled (Step S412 in the flowchart of FIG. 4). In the example of FIG. 6, all control target devices in the network illustrated in FIG. 1, i.e., the controller 101 and the renderers 103, 104, and 105 are displayed. If any other control target device exists, the scrolling operation is performed in the horizontal direction to display the control target device such that the control target device can be selected.

Upon selection of the control target device, the device is newly set as the current target device (Step S413 in the flowchart of FIG. 4), and the display of the LCD 202 switches to the operation panel for controlling the device. In this case, the operation panel displays the thumbnail image and the device name of the newly set current target device.

Figure 7:
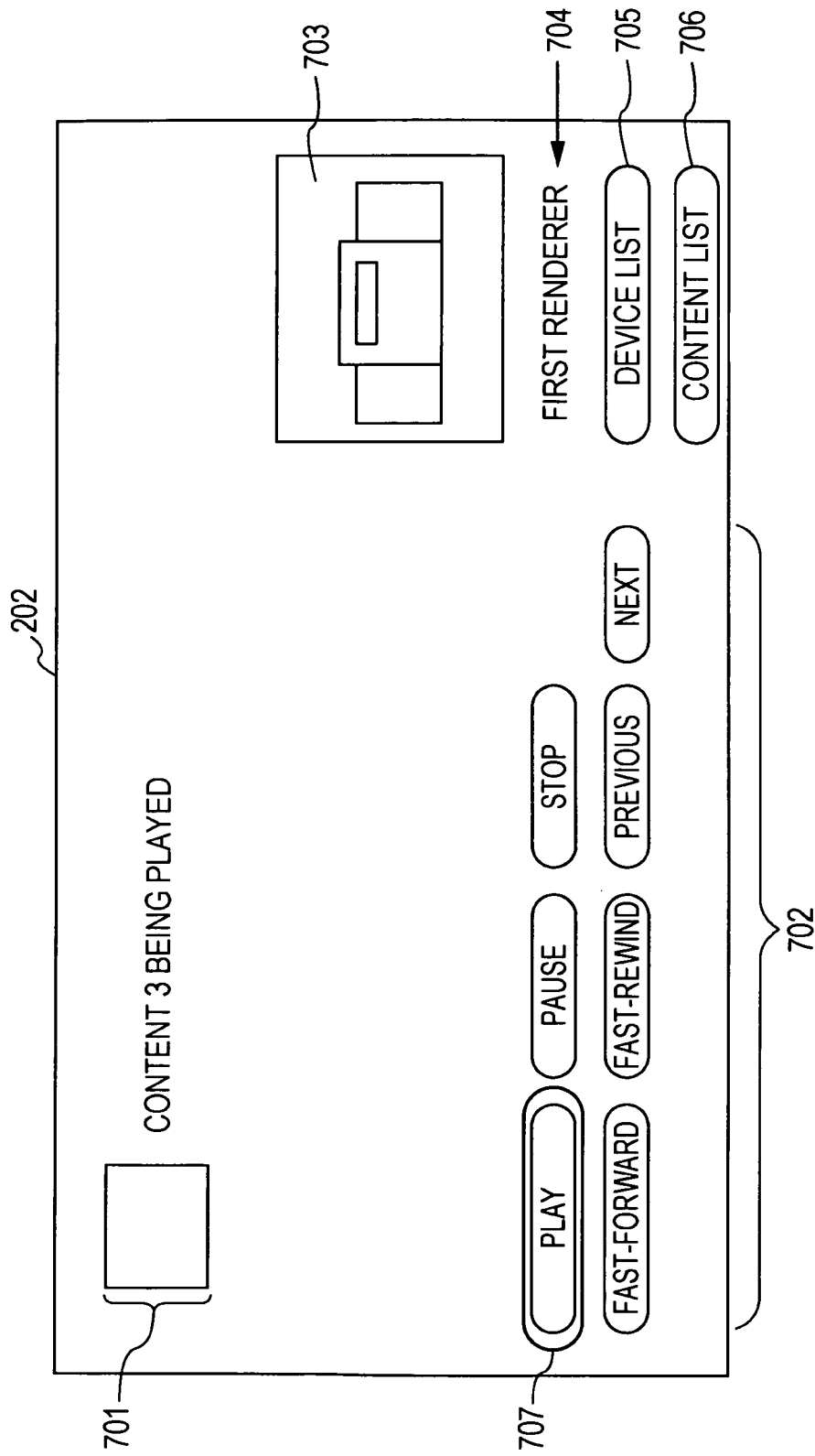
FIG. 7 is a schematic diagram illustrating an operation panel display screen in an embodiment of the present invention.

FIG. 7 illustrates an example in which the operation panel for operating the first renderer 103 is displayed on the screen of the LCD 202 (Step S417 in the flowchart of FIG. 4). As illustrated in FIG. 7, the display area of the LCD 202 displays content reproduction information 701 showing the information of the selected content item such as the jacket photograph of the content item, for example, and the reproduction state in the current target device such as a message reading "CONTENT 3 BEING PLAYED," for example. The display area of the LCD 202 further displays an operation button group 702 for controlling the current target device, a thumbnail image 703 showing the shape of the current target device, a device name 704, a control target device list call button 705, and a content list call button 706.

In FIG. 7, a focus 707 is positioned on a "PLAY" button of the operation button group 702. The user operates the input unit 204 of FIG. 2 to move the focus 707 and select the button allocated with the function desired to be operated. Thereby, the current target device is controlled. FIG. 7 illustrates an example in which the current target device currently reproducing the content item is the renderer 103. The type of the operation button group 702 illustrated in FIG. 7 is one example, and thus does not limit the type and shape of the buttons.

If the control target device list call button 705 is pressed, the screen can be switched to the control target device list display state (see FIG. 6). That is, the display of the control target device list can be invoked from both the operation panel display state and the content list display state.

Further, the content list call button 706 is provided. If the content list call button 706 is pressed, the screen can be switched to the content list display state (see FIG. 5). That is, it is possible to switch the display from the operation panel of FIG. 7 to the content list of FIG. 5 while continuing the content reproduction operation, and to select another content item while displaying the content list. The reproduction of the current content item continues, unless a reproduction instruction to reproduce a new content item of the content list is issued. With the operation of the operation panel call button 505 in FIG. 5, it is possible to return the screen to the operation panel display state while continuing the reproduction operation. The function of each of the call buttons 705 and 706 may be allocated not to the GUI button but to a hardware key of the controller 101.

Figure 8:
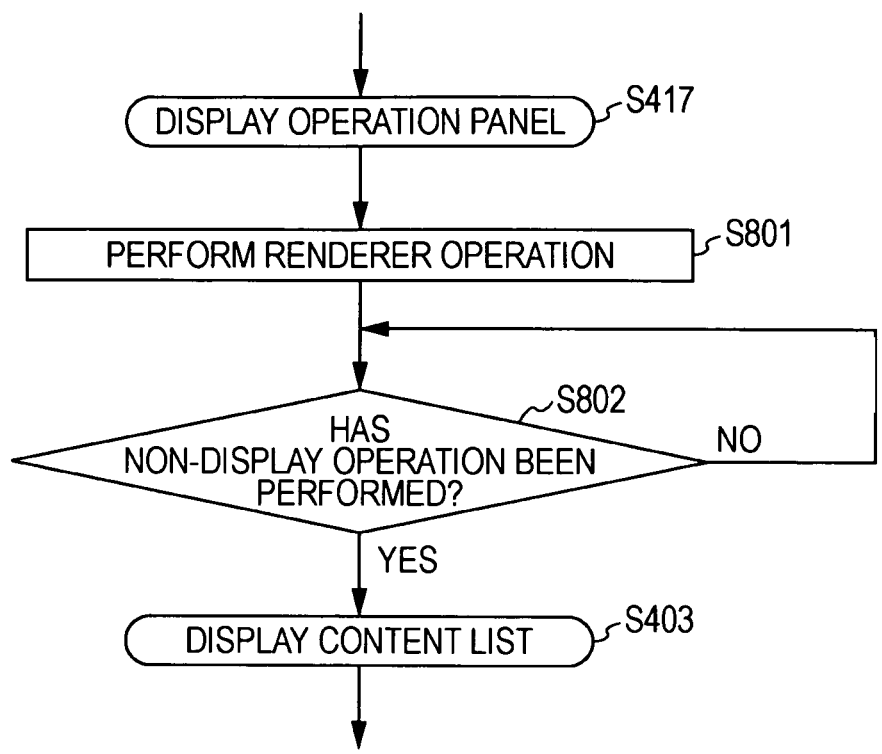
FIG. 8 is a flowchart illustrating a processing flow in an embodiment of the present invention.

Further, the embodiment may be configured such that, if a predetermined operation other than the pressing on the content list call button 706 is performed on the operation panel in the operation panel display state (FIG. 7), the screen returns from the operation panel display state to the content list display state. As illustrated in FIG. 8, after a renderer operation is performed at Step S801, whether or not the operation is a non-display operation is determined at Step S802. For example, if a "STOP" button of the operation button group 702 is operated, the content reproduction operation is ended, and the screen returns to the display of the content list. Similarly, also when a predetermined hardware key for instructing the termination of an application is operated, the content reproduction operation is ended, and the screen returns to the display of the content list.

As described above, it is possible to easily switch between the content list display state, the control target device list display state, and the operation panel display state, and to display the current target device on the screen in any of the above display states. Therefore, the user can immediately identify which device in the network is being controlled. In particular, the thumbnail image of the current target device is constantly displayed in all of the content list display state, the control target device list display state, and the operation panel display state of the controller. Therefore, the user can perform an operation without losing track of the current target device.

The present invention is not limited to the embodiments described above, and thus can be modified in a variety of ways on the basis of the technical concept of the present invention. It should be understood by those skilled in the art that various modifications, combinations, sub-combinations and alterations may occur depending on design requirements and other factors insofar as they are within the scope of the appended claims or the equivalents thereof.

What is claimed is:

1. A control device comprising:
   a communication unit configured to communicate, via a network, with a content supply device supplying content and a plurality of reproduction devices reproducing the content transmitted from the content supply device;
   an operation unit;
   a display unit; and a control unit configured to be supplied with a signal from the operation unit and control the communication unit and the display unit, wherein the control unit has a content list display state in which a content list received from the content supply device is displayed on a screen of the display unit, a device list display state in which respective thumbnail images of the plurality of reproduction devices are displayed on the screen in accordance with device information received from the plurality of reproduction devices, and an operation panel display state in which an operation panel is displayed to enable a desired operation function from among a number of operation functions including a reproduction function to be performed on a selected content item of the content list by one of the plurality of reproduction devices set as a control target in the device list display state, wherein each of the screen for the content list display state, the screen for the device list display state, and the screen for the operation panel display state are separate from each other such that only one of the screen for the content list display state, the screen for the device list display state, and the screen for the operation panel display state is displayable at a time on the display unit, wherein in the operation panel display state the screen displayed on the display unit includes (i) a picture pertaining to the selected content item, (ii) the thumbnail image of the set reproduction device, and (iii) a content list button which when activated causes the screen to be directly changed so as to cause the content list of the content list display state to be displayed, wherein when in the content list display state the screen displayed on the display unit includes (i) the content list, (ii) the thumbnail image of the set reproduction device, (iii) an operation panel button which when activated causes the screen to be changed so as to cause the operation panel to be displayed, and (iv) a device list button which when activated causes the screen to be changed so as to cause the respective thumbnail images of the plurality of reproduction devices of the device list display state to be displayed, and wherein in the device list display state the screen displayed on the display unit includes an indication of the set reproduction device such that in each separate screen for the content list display state, the device list display state, and the operation panel display state the set reproduction device is identified.

2. The control device according to claim 1,
wherein each of the reproduction devices stores the thumbnail image thereof, and
wherein the device information includes the thumbnail image.

3. The control device according to claim 1,
wherein the control device has a function of reproducing the content, and
wherein the control device is capable of displaying the thumbnail image thereof in the content list display state, the device list display state, and the operation panel display state.

4. The control device according to claim 1,
wherein, upon receipt of the content list from the content supply device, the control unit shifts to the content list display state,
wherein, upon receipt of the device information, the control unit shifts to the device list display state, wherein, when a respective content item selected in the content list display state is reproduced, the control unit shifts to the operation panel display state, and wherein, upon receipt of an instruction not to display the operation panel in the operation panel display state, the control unit shifts to the content list display state.

5. A control method for performing communication, via a communication unit and a network, with a content supply device supplying content and a plurality of reproduction devices reproducing the content transmitted from the content supply device, the control method comprising the steps of:

displaying, upon receipt of a content list from the content supply device, the content list on a screen of a display unit;

displaying a device list displaying respective thumbnail images of the plurality of reproduction devices on the screen in accordance with device information received from the plurality of reproduction devices; and displaying an operation panel on the screen for enabling a desired operation function from among a number of operation functions including a reproduction function to be performed on a selected content item of the content list by one of the plurality of reproduction devices set as a control target in the step of displaying the device list, wherein each of the screen for the content list display, the screen for the device list display, and the screen for the operation panel display are separate from each other such that only one of the screen for the content list display, the screen for the device list display, and the screen for the operation panel display is displayable at a time on the display unit, wherein in the step of displaying the operation panel the screen displayed on the display unit includes (i) a picture pertaining to the selected content item, (ii) the thumbnail image of the set reproduction device, and (iii) a content list button which when activated causes the screen to be directly changed so as to cause the content list of the content list display state to be displayed, wherein when in a content list display state the screen displayed on the display unit displays (i) the content list, (ii) the thumbnail image of the set reproduction device, (iii) an operation panel button which when activated causes the screen to be changed so as to cause the operation panel to be displayed, and (iv) a device list button which when activated causes the screen to be changed so as to cause the respective thumbnail images of the plurality of reproduction devices to be displayed, and wherein the device list displayed on the screen of the display unit includes an indication of the set reproduction device such that in each separate screen for the content list display, the device list display, and the operation panel display the set reproduction device is identified.

6. A control system connecting, via a network, a content supply device supplying content, a plurality of reproduction devices reproducing the content transmitted from the content supply device, and a control device operating a selected one of the plurality of reproduction devices, wherein the control device includes
a communication unit connected to the network and configured to communicate with the content supply device and the plurality of reproduction devices,
an operation unit,
a display unit, and
a control unit configured to be supplied with a signal from the operation unit and control the communication unit and the display unit, wherein the control unit has a content list display state in which a content list received from the content supply device is displayed on a screen of the display unit, a device list display state in which respective thumbnail images of the plurality of reproduction devices are displayed on the screen in accordance with device information received from the plurality of reproduction devices, and an operation panel display state in which an operation panel is displayed on the screen to enable a desired operation function from among a number of operation functions including a reproduction function to be performed on a selected content item of the content list by one of the plurality of reproduction devices set as a control target, wherein each of the screen for the content list display state, the screen for the device list display state, and the screen for the operation panel display state are separate from each other such that only one of the screen for the content list display state, the screen for the device list display state, and the screen for the operation panel display state is displayable at a time on the display unit, wherein in the operation panel display state the screen displayed on the display unit includes (i) a picture pertaining to the selected content item, (ii) the thumbnail image of the set reproduction device, and (iii) a content list button which when activated causes the screen to be directly changed so as to cause the content list of the content list display state to be displayed, wherein when in the content list display state the screen displayed on the display unit includes (i) the content list, (ii) the thumbnail image of the set reproduction device, (iii) an operation panel button which when activated causes the screen to be changed so as to cause the operation panel to be displayed, and (iv) a device list button which when activated causes the screen to be changed so as to cause the respective thumbnail images of the plurality of reproduction devices of the device list display state to be displayed, and wherein in the device list display state the screen displayed on the display unit includes an indication of the set reproduction device such that in each separate screen for the content list display state, the device list display state, and the operation panel display state the set reproduction device is identified.

* * * * *